United States Patent
Deng et al.

(10) Patent No.: US 7,929,980 B2
(45) Date of Patent: Apr. 19, 2011

(54) MOBILE COMMUNICATION DEVICE AND METHOD FOR SHORT MESSAGE SERVICE SPAM PREVENTING

(75) Inventors: Yong-Jun Deng, Shenzhen (CN); De-Zhi Li, Shenzhen (CN); Shih-Fang Wong, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 737 days.

(21) Appl. No.: 11/966,976

(22) Filed: Dec. 28, 2007

(65) Prior Publication Data

US 2009/0054090 A1 Feb. 26, 2009

(30) Foreign Application Priority Data

Aug. 22, 2007 (CN) .......................... 2007 1 0201426

(51) Int. Cl.
*H04W 4/00* (2009.01)
(52) U.S. Cl. .................. 455/466; 455/412.2; 455/550.1; 455/414.1
(58) Field of Classification Search .................. 455/466, 455/418, 415, 412.1, 412.2
See application file for complete search history.

(56) References Cited

U.S. PATENT DOCUMENTS

| | | | | |
|---|---|---|---|---|
| 6,993,364 | B2 * | 1/2006 | Sierawski et al. | 455/567 |
| 7,583,671 | B2 * | 9/2009 | Ramani et al. | 370/392 |
| 2005/0114452 | A1 | 5/2005 | Prakash | |
| 2006/0079255 | A1 | 4/2006 | Bantukul et al. | |
| 2006/0148496 | A1 * | 7/2006 | Zhu et al. | 455/466 |
| 2007/0287483 | A1 * | 12/2007 | Park et al. | 455/466 |

* cited by examiner

*Primary Examiner* — Kamran Afshar
*Assistant Examiner* — Vladimir Magloire
(74) *Attorney, Agent, or Firm* — Frank R. Niranjan

(57) ABSTRACT

A mobile communication device includes a receiver, a buffer, a memory, an identifier, and a deleting module. The receiver is used for receiving short message service messages. The buffer is used for storing the short message service messages temporarily. The memory is used for storing a plurality of contact records. The identifier is used for identifying the short message service messages based on the contact records. The deleting module is used for deleting the short message service messages from the buffer if the short message service messages don't pass the identifying action. A mobile communication method is also disclosed.

17 Claims, 3 Drawing Sheets

| Contact name 1 | Phone number | Destination MIN | Sent message history | Previous received message history | ... |
|---|---|---|---|---|---|
| Contact name 2 | Phone number | Destination MIN | Sent message history | Previous received message history | ... |
| Contact name 3 | Phone number | Destination MIN | Sent message history | Previous received message history | ... |
| Contact name 4 | Phone number | Destination MIN | Sent message history | Previous received message history | ... |

A plurality of contact records

FIG. 2

MOBILE COMMUNICATION DEVICE AND METHOD FOR SHORT MESSAGE SERVICE SPAM PREVENTING

BACKGROUND

1. Field of the Invention

The present invention generally relates to mobile communication devices and methods, and more particularly to a mobile communication device and a mobile communication method for preventing spam messages.

2. Description of Related Art

Mobile communication devices, such as mobile phones, personal digital assistants (PDA), notebook computers, and so on, are now configured to transmit and receive text messages, such as short message service (SMS) messages. SMS is a popular and convenient service available on most mobile communication devices that permits sending of short messages between mobile communication devices. SMS was originally designed as part of the global system for mobile communications (GSM) digital mobile phone standard, but is now available on a wide range of networks, including third generation (3G) networks.

However, as the popularity of the mobile communication devices continue to rise, SMS messaging is widely used as a retail advertising medium. In fact, some of the SMS services offer automated messages sent on a regular basis, bringing news, weather, financial information, sporting event scores, and other information. As such, SMS subscribers may find themselves a constant target of unwanted SMS messages, often referred to as spam messages. The spam messages may be a nuisance to mobile subscribers and may also increase traffic on the network.

Therefore, improvements for a mobile communication device and a mobile communication method are needed in the industry to address the aforementioned deficiency.

SUMMARY

A mobile communication device includes a receiver, a buffer, a memory, an identifier, and a deleting module. The receiver is used for receiving short message service messages. The buffer is used for storing the short message service messages temporarily. The memory is used for storing a plurality of contact records. The identifier is used for identifying the short message service messages based on the contact records. The deleting module is used for deleting the short message service messages from the buffer if the short message service messages don't pass the identifying action. A mobile communication method is also disclosed.

Other advantages and novel features of the present invention will become more apparent from the following detailed description of preferred embodiment when taken in conjunction with the accompanying drawings.

BRIEF DESCRIPTION OF THE DRAWINGS

FIG. 2 is a schematic diagram showing a plurality of contact records stored in the mobile communication device of FIG. 1.

DETAILED DESCRIPTION OF THE EMBODIMENTS

Reference will now be made to the drawings to describe a preferred embodiment of the present mobile communication device and a preferred embodiment of the present mobile communication method.

Figure 1:
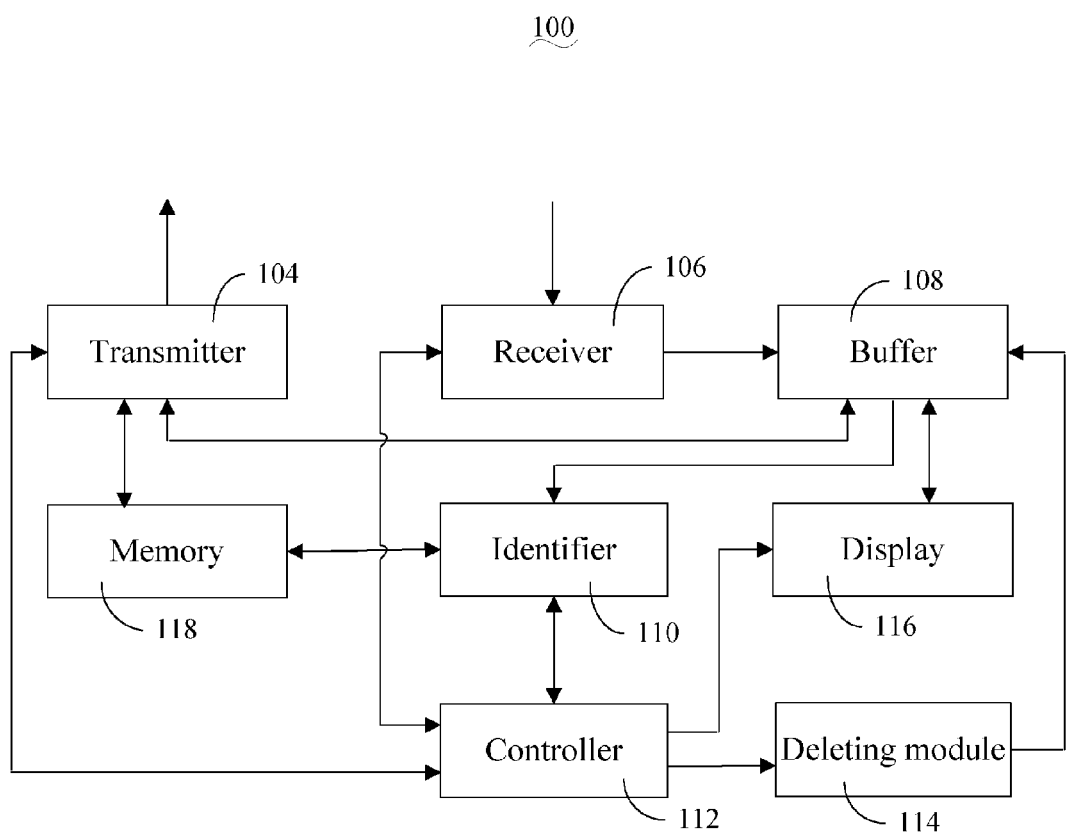
FIG. 1 is a schematic diagram showing a mobile communication device in accordance with an exemplary embodiment.

Referring to FIG. 1, a mobile communication device 100 in accordance with an exemplary embodiment is used to transmit and receive useful short message service (SMS) messages, and to prevent spam messages. The mobile communication device 100 has a unique mobile identification number (MIN) assigned by mobile service providers after a subscriber of the mobile communication device 100 purchases mobile telecom services from the mobile service providers.

In the embodiment, an incoming SMS message, received by the mobile communication device 100, ordinarily includes a source phone number, a message, a destination MIN etc. However, if this is the first time the mobile communication device 100 receives the incoming SMS message, the message of the incoming SMS message only contains the destination MIN. If the destination MIN carried in the message of the incoming SMS message is the same as the unique MIN of the mobile communication device 100, the mobile communication device 100 transmits a confirmation message to a source of the incoming SMS message. Subsequently, the mobile communication device 100 will receive another SMS message including a source phone number, a normal message, the destination MIN etc.

The mobile communication device 100 includes a transmitter 104, a receiver 106, a buffer 108, an identifier 110, a controller 112, a deleting module 114, a display 116, and a memory 118. The transmitter 104 is used for transmitting an SMS message, and the receiver 106 is used for receiving the incoming SMS message. The buffer 108 is used for storing incoming SMS messages temporarily.

As shown in FIG. 2, the memory 118 is used for storing a plurality of contact records 010. Each contact record 010 records information, such as a contact name 011, a contact phone number 012, a destination MIN 014, sent message history 016, previous received message history 018, and other information 020. A value of the sent message history 016 and the previous received message history 018 may be an index number of "0" and "1" to represent a success or a failure respectively.

The identifier 110 is used for reading the sent message history 016 and the previous received message history 018, and comparing the unique MIN of the mobile communication device 100 with the source MIN of the incoming SMS message. The controller 112 is used for controlling the identifier 110, the deleting module 114, and the display 116.

In operation, when the mobile communication device 100 receives the incoming SMS message, the incoming SMS message is stored temporarily in the buffer 108. The identifier 110 searches the memory 118 for the contact record with the contact phone number matching the source phone number of the incoming SMS message. If the contact phone number is not found, the deleting module 114 deletes the incoming SMS message from the buffer 108. If the contact phone number is found, the identifier 110 reads the received message history of the contact record with the contact phone number. If the index number of the received message history is "1", that is, this is not the first time that the mobile communication device 100 receives the incoming SMS message, the display 116 displays the incoming SMS message. If the index number of the received message history is "0", that is, this is the first time that the mobile communication device 100 receives the incoming SMS message, the identifier 110 continues to compare the unique MIN of the mobile communication device 100 with the destination MIN carried in the incoming SMS message.

If the unique MIN of the mobile communication device 100 and the destination MIN carried in the incoming SMS message are the same, the transmitter 104 transmits the confirmation message and updates the index number of the sent message history 016 to be "1". If the unique MIN of the mobile communication device 100 is different from the destination MIN carried in the incoming SMS message, the deleting module 114 deletes the incoming SMS message from the buffer 108.

As mentioned above, the mobile communication device 100 uses the buffer 108 to store the incoming SMS message temporarily, and uses the identifier 110 to identify the incoming SMS message based on the contact records 010 before displaying the incoming SMS message. The incoming SMS message is deleted as a spam message if the identification operation is failed.

Figure 3:
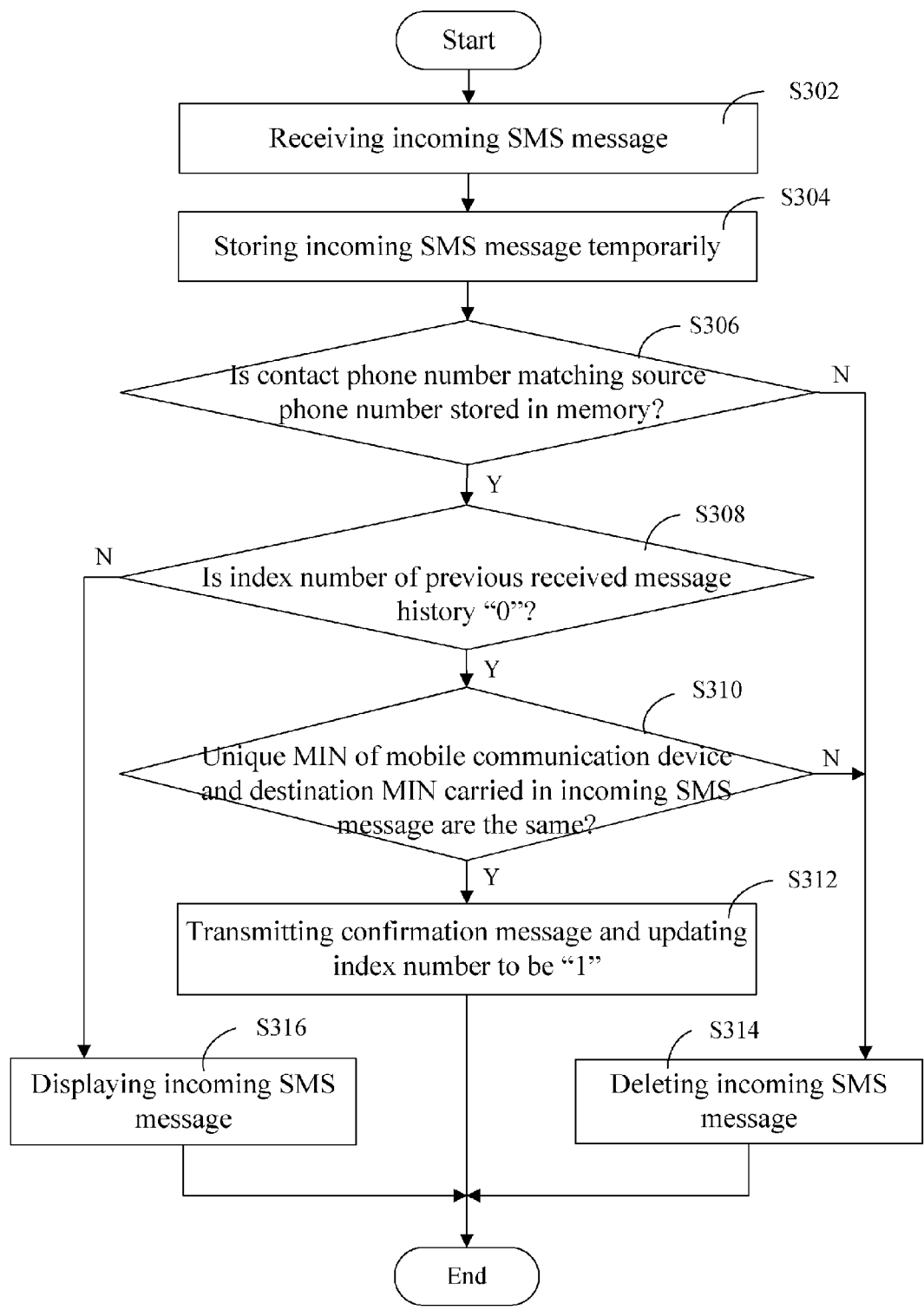
FIG. 3 is a process flow diagram illustrating a mobile communication method in accordance with an exemplary embodiment.

Referring to FIG. 3, a mobile communication method for preventing spam messages in accordance with an exemplary embodiment includes the following steps.

The receiver 106 receives an incoming SMS message (step S302).

The buffer 108 stores the incoming SMS message temporarily (step S304).

The identifier 110 searches the memory 118 for a contact phone number that matches the source phone number carried in the incoming SMS message (step S306). If the contact phone number is found in the memory 118, the procedure of the mobile communication method goes to step S308. If the contact phone number is not found, the procedure goes to step S314.

The identifier 110 identifies the previous received message history 018 corresponding to the contact phone number (step S308). If the index number of the previous received message history 018 is "0", the procedure goes to step S310. If the index number of the previous received message history 018 is "1", the procedure goes to step S316.

The identifier 110 compares the unique MIN of the mobile communication device 100 with the destination MIN of the incoming SMS message (step S310). If the unique MIN of the mobile communication device 100 and the destination MIN of the incoming SMS message are the same, the procedure goes to step S312. If the unique MIN of the incoming SMS message is different from the destination MIN of the mobile communication device 100, the procedure goes to step S314.

The transmitter 104 transmits the confirmation message and updates the index number of the sent message history 016 to be "1" (step S312).

The deleting module 114 deletes the incoming SMS message from the buffer 108 (step S314).

The display 116 displays the incoming SMS message (step S316).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mobile communication device comprising:
   a receiver for receiving an incoming short message service message;
   a buffer for storing the incoming short message service message temporarily;
   a memory for storing a plurality of contact records, each contact record comprising a contact name, a contact phone number, a destination mobile identification number, and a previous received message history, the previous received message history comprising two index numbers "1" and "0", and the index number "1" indicates that the mobile communication device has previously received another incoming short message service message, while the index number "0" indicates that the mobile communication device has not previously received another incoming short message service message;
   an identifier for searching the memory for a contact phone number that matches with a source phone number carried in the incoming short message service message; identifying a previous received message history corresponding to the contact phone number if the contact phone number is found; and comparing a unique mobile identification number of the mobile communication device with a destination mobile identification number carried in the incoming short message service message if the index number of the received message history is "0"; and
   a deleting module for deleting the incoming short message service message if the unique mobile identification number of the mobile communication device is different from the destination mobile identification number of the incoming short message service message.

2. The mobile communication device according to claim 1, further comprising a transmitter for transmitting a short message service message.

3. The mobile communication device according to claim 2, wherein each contact record further comprises a sent message history.

4. The mobile communication device according to claim 3, wherein the sent message history comprises two index numbers "1" and "0", and the index number "1" indicates that the mobile communication device has sent another short message service message, while the index number "0" indicates that the mobile communication device has not sent another short message service message.

5. The mobile communication device according to claim 4, wherein the transmitter is used for transmitting a confirmation message and updating the index number of the sent message history to be "1" if the unique mobile identification number of the mobile communication device and the destination mobile identification number of the incoming short message service message are the same.

6. The mobile communication device according to claim 1, further comprising a controller for controlling the identifier and the deleting module.

7. The mobile communication device according to claim 1, further comprising a display for displaying the incoming short message service message.

8. The mobile communication device according to claim 7, wherein the display displays the incoming short message service message if an index number of the received message history is "1".

9. The mobile communication device according to claim 1, wherein the deleting module is further used for deleting the incoming short message service message if the contact phone number is not found.

10. A mobile communication method comprising:
    receiving an incoming short message service message;
    storing the incoming short message service message temporarily;
    searching for a contact phone number that matches with a source phone number carried in the incoming short message service message;
    identifying a previous received message history corresponding to the contact phone number if the contact phone number is found;
    comparing a unique mobile identification number of the mobile communication device with a destination mobile identification number carried in the incoming short message service message if the index number of the received message history is "0"; and
    deleting the incoming short message service message if the unique mobile identification number of the mobile communication device is different from the destination mobile identification number of the incoming short message service message.

11. The mobile communication method according to claim 10, further comprising:
    displaying the incoming short message service message if an index number of the received message history is "1".

12. The mobile communication method according to claim 10, further comprising:
    deleting the incoming short message service message if the contact phone number is not found.

13. The mobile communication method according to claim 10, further comprising:
    transmitting a confirmation message and updating the index number of the sent message history to be "1" if the unique mobile identification number of the mobile communication device and the destination mobile identification number of the incoming short message service message are the same.

14. A mobile communication device, comprising:
    a receiver adapted to receive an incoming short message service message;
    a buffer adapted to store the incoming short message service message;
    a memory adapted to store a plurality of contact records, each contact record comprising a contact phone number, a destination mobile identification number, and a previous received message history;
    an identifier adapted to search the memory for a contact phone number that matches with a source phone number carried in the incoming short message service message; identify a previous received message history corresponding to the contact phone number if the contact phone number is found; and compare a unique mobile identification number of the mobile communication device with a destination mobile identification number carried in the incoming short message service message if the index number of the received message history is null; and
    a deleting module for deleting the incoming short message service message if the unique mobile identification number of the mobile communication device is different from the destination mobile identification number of the incoming short message service message.

15. The mobile communication device according to claim 14, wherein the deleting module is further adapted to delete the incoming short message service message if the contact phone number is not found.

16. The mobile communication device according to claim 14, further comprising a display for displaying the incoming short message service message if an index number of the received message history is not null.

17. The mobile communication device according to claim 14, wherein each contact record further comprises a sent message history, the mobile communication device further comprises a transmitter for transmitting a confirmation message and updating the corresponding sent message history to be not null if the unique mobile identification number of the mobile communication device and the destination mobile identification number of the incoming short message service message are the same.

* * * * *